Aug. 9, 1966 E. J. CARLISLE 3,265,394

PORTABLE RECORD PLAYER

Filed April 5, 1963 3 Sheets-Sheet 1

INVENTOR
ERNEST J. CARLISLE
BY
Ward, Neal, Haselton, Orme & McElhannon
ATTORNEYS Aug. 9, 1966

E. J. CARLISLE 3,265,394

PORTABLE RECORD PLAYER

Filed April 5, 1963

3 Sheets-Sheet 2

INVENTOR.
ERNEST J. CARLISLE

BY
Ward, Neal, Haselton, Orme & McElhannon

ATTORNEYS

Aug. 9, 1966 E. J. CARLISLE 3,265,394

PORTABLE RECORD PLAYER

Filed April 5, 1963 3 Sheets-Sheet 3

INVENTOR.
ERNEST J. CARLISLE

BY
Ward, Neal, Haselton, Orme & McElhannon

ATTORNEYS

United States Patent Office 3,265,394
Patented August 9, 1966

3,265,394
PORTABLE RECORD PLAYER
Ernest J. Carlisle, 435 Wildwood Road, Northvale, N.J.
Filed Apr. 5, 1963, Ser. No. 270,929
5 Claims. (Cl. 274—15)

This invention relates to record players and more particularly to new and improved portable record players.

While record players have been known and utilized for many years, they have been characterized by certain imperfections, not the least of which is their lack of ability to withstand shock, concussion or other sudden movements which tend to interrupt or disturb the reception or permanently injure the apparatus. Accordingly, one of the objects of the present invention is to provide a record player which overcomes these imperfections in a reliable manner. Thus, record players embodying my invention are particularly adapted, among other possible uses, for playing at parties, on the beach or in the home. It is ideally suited for use in an automobile especially on extended trips. An important feature of my invention resides in a construction whereby a record is held securely on a turn-table while sound pick-up means engages the record all in a manner to resist displacement due to impact, vibration and the like.

Another object of my invention resides in the provision of a portable, lightweight, and compact record player that may be employed for the aforementioned purposes. Record players constructed in accordance with the invention are inexpensive to manufacture and durably constructed so that children may play with and enjoy same without adversely affecting the normal operation thereof. Still another object of this invention is the provision of sound pick-up means which are encased and protected from outside disturbances.

A further object of the invention is the provision of new and improved linkage means for returning the sound pick-up means to its initial position on the record, without the operator touching such means, which means are simple to operate and can withstand abuse without disturbing the functioning of the apparatus.

Still another object of my invention resides in the provision of simplified means for changing records and protecting such records during operation.

Thus, I have conceived an effective and practical solution to the problems presented and have actually constructed a successfully operating and commercially desirable record player based upon that concept. In essence, my invention contemplates the provision of a record player comprising a vertically or obliquely disposed turn-table and magnetic means for positioning and securing a record on such turn-table. I provide motive means for rotating the turn-table, sound pick-up means which are urged towards a record supported on the turn-table, and pick-up means which are adapted to traverse the record from an initial position thereon. I also provide means with cooperate with the sound pick-up means for amplifying the sound waves picked up by the pick-up means and carrying them to a speaker. Power means activate the amplifying apparatus, and means are provided for returning the sound pick-up means to its original position.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 7:
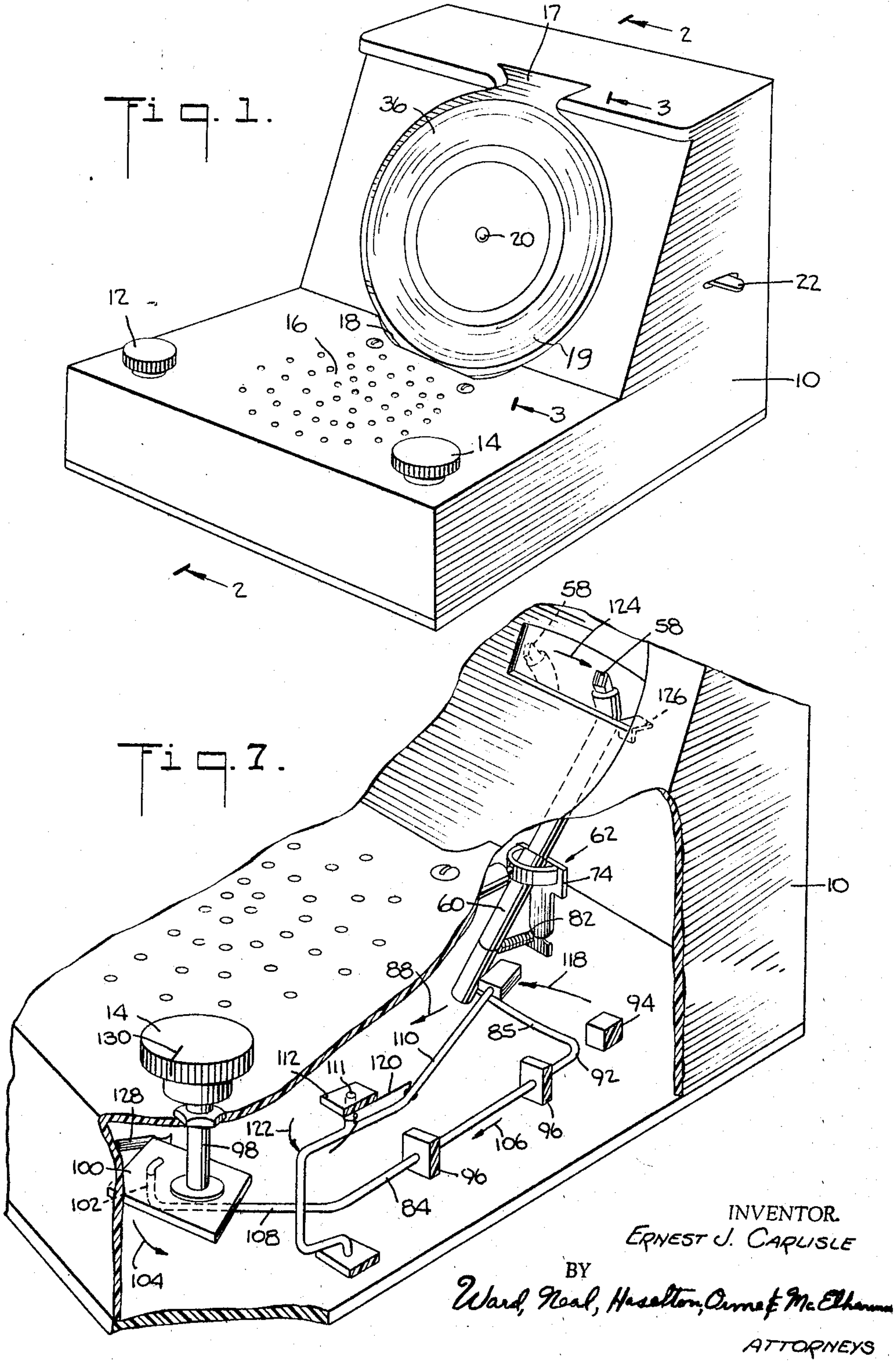
FIG. 1 is a perspective view showing a record player constructed in accordance with the concepts of my invention.
FIG. 7 is a perspective view, similar to FIG. 6, of the needle control apparatus in another position of operation thereof.

In the illustrated embodiment of my invention, a housing 10 functions as an ornamental external cover and as a structural supporting frame as best seen in FIG. 1. Extending from the housing 10 are a pair of knobs 12 and 14, knob 12 being the on and off switch for the machine, the switch for the turn-table motor circuit, as well as providing the volume control, and knob 14 actuates the linkage which returns the pick-up needle to its initial position upon the record. The upper front portion of the housing 10 is provided with a plurality of holes or apertures 16 for the emission of sound, and at the side of the housing is provided a speed control lever 22 for adjusting the rotational speed of the turn-table, as desired. A recess 17 is provided in the top of the housing 10 for the operator's fingers when putting on or taking off a record. A pocket 18 is provided in the front of the housing 10 so that when a record is to be placed in playing position, the end edge thereof is inserted therein. Thence, the operator may release his grip upon the record and magnetic means, which will be more fully described hereinafter, will automatically position the record accurately upon the turn-table. This is particularly important when the record player is to be utilized in an automobile because the driver can readily insert the record into the pocket 18 without the necessity of taking his eyes off the road. The front face of the housing 10 is provided with a recess 19 of substantially circular configuration and having a depth of the order of ⅜ to ½ inches. Thus, the outside face of a record which is in playing position resides below the front face of the housing 10 and is thereby protected from extraneous objects that might bump or brush thereagainst.

Figures 2, 3, 5:
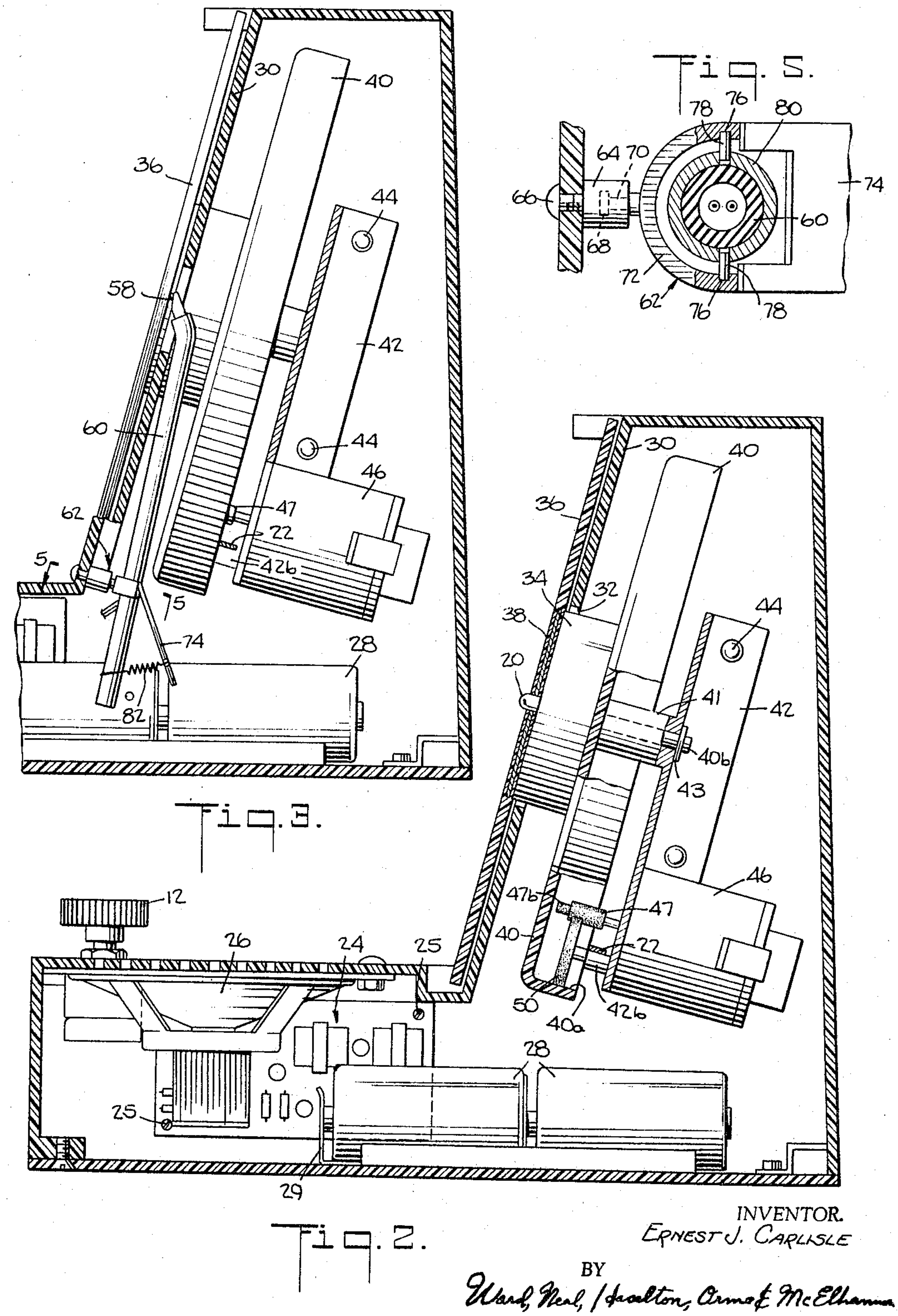
FIG. 2 is an enlarged sectional view taken at lines 2—2 of FIG. 1.
FIG. 3 is an enlarged sectional view taken at lines 3—3 of FIG. 1.
FIG. 5 is an enlarged sectional view taken along lines 5—5 of FIG. 3.

As shown in FIG. 2, the control knob 12 is in electrically operative relationship with the amplifying means designated generally by reference numeral 24 and attached to the housing 10 by means of screws 25. The amplifying means 24 are also in electically operative relationship with a speaker 26, the front of which is positioned adjacent the housing 10 below apertures 16. Power supply source 28 is operatively connected to the amplifying means 24, and may be in the form of four flashlight dry cells, for example, which are removably retained in position against the bottom wall of the housing 10 by means of clips 29. It should be noted that the internal construction of the amplifying means 24 and the speaker 26 are well known in the art and per se form no part of this invention. Therefore, I have not illustrated in detail this portion of the machine in the accompanying drawings.

Figures 4, 6:
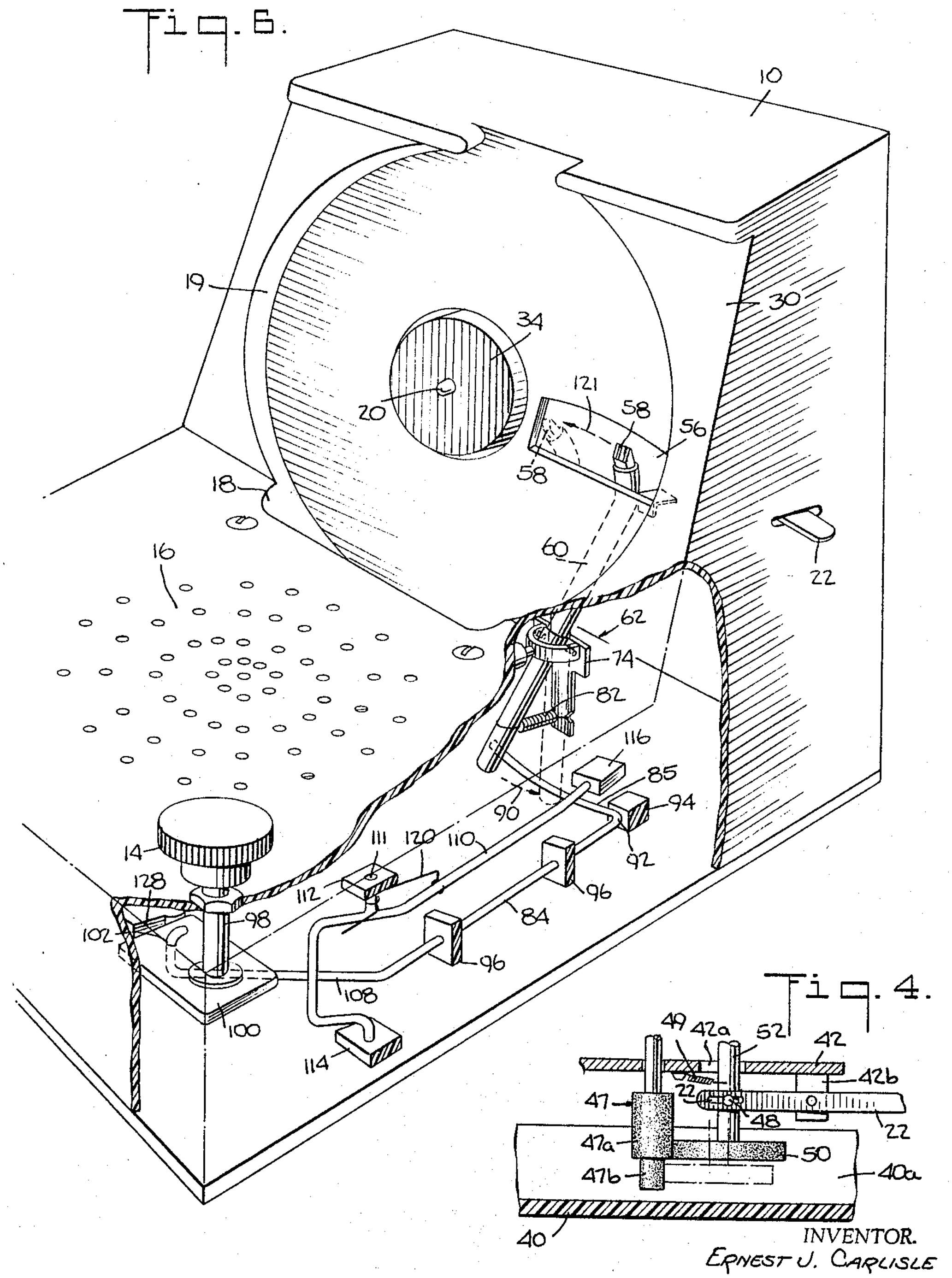
FIG. 4 is an enlarged plan view showing the record speed changing apparatus.
FIG. 6 is an enlarged perspective view partially broken away to reveal the needle control apparatus.

With particular reference to FIGS. 2 and 3, the housing 10 is provided with a front wall 30 having an aperture 32 therein, into which a turn-table 34, containing magnetic material, extends. A record 36 is shown positioned outwardly of the front wall 30, and provided with a centrally disposed ferrous insert 38 which removably adheres to the magnetic turn-table 34 and, thereby, is retained in position and is rotated with spindle 20, during operation of the record player. It will be seen that the wall 30 may be substantially vertical or obliquely disposed, preferably 15 degrees from the vertical and the axes of the turn-table and spindle are perpendicular to the plane of the wall 30. The turn-table 34 is fixedly attached or connected to a drum 40 having an internal friction surface **40*a* and an inwardly projecting pin 40*b*. A bearing block 41 is fixedly connected to a bracket 42 which is mounted on the housing 10 by means of screws 44. Such bearing block 41 is provided with a centrally disposed boring which is adapted to receive and provide a bearing surface for pin 40*b*. The pin 40*b* is retained in position by suitable means such as a snap ring 43. Excessive end play is eliminated because the inside face of the drum 40 engages the bearing block 41. Also mounted on bracket 42 is an electric motor 46 which is operatively connected to the power source 28. The motor 46 is provided with a step capstan 47 having driving surfaces 47*a* and 47*b* of different diameters one from the other. Interposed between the internal friction surface 40*a* of the drum 40 and the capstan 47 is a wheel 50 having a resilient peripheral surface such as rubber or the like. The wheel 50 is rotatably mounted on shaft 52 which is supported in slot 42*a* of bracket 42 so that it is free to reciprocate as well as move along the slot surface. A tension spring 49 has one end thereof fixedly connected to the bracket 42 and the other end thereof fixedly connected to the shaft 52 so that such shaft is urged towards the capstan 47 as illustrated in FIG. 4. This tends to increase the wedging effect and thereby increases the contact forces between the wheel 50 and the capstan 47 and the drum 40. Speed control lever 22 is pivotally mounted on bearing projection 42*b* of the bracket 42 and the end of said lever is provided with a slot 22*a* which receives a pin 48 which, in turn is fixedly connected to shaft 52. Thus, movement of the lever 22 reciprocates the shaft 52 so that wheel 50 engages either surface 47*a* or 47*b* of the capstan 47 (as shown in solid lines and broken lines, respectively, in FIG. 4) while simultaneously engaging the internal friction surface 40*a* of the drum 40** depending upon the desired record speed.

The front wall 30 is provided with a second aperture or slot 56 in order that a sound pick-up means, such as a stylus or needle 58, may project therethrough to engage the underside of the record 36. Needle 58, removably attached to the end of an arm 60, provides the sound pick-up and is electrically operatively connected to the amplifying means 24 in known manner. The arm 60 is pivotally mounted for movement by a universal joint designated generally by the reference numeral 62 as shown in FIGS. 4, 5 and 6, the universal joint 62 comprises a bearing block 64 which is secured to the front wall 30 as by means of a screw 66. Such bearing block 64 is provided with a key slot 68 for receiving a projecting key portion 70 of a yoke 72, thereby permitting rotational movement about key 70. Yoke 72 is secured to a bracket 74 and is, further, provided with a pair of oppositely disposed borings 76 which form the journals for pins 78 which are fixedly attached to a sleeve 80. The arm 60 is fixedly connected to the inside of the sleeve 80. One end of a helical spring 82 is attached to the bracket 74 and the other end thereof is attached to the arm 60 to pivot the arm 60 about pin 78 in order to urge the needle 58 outwardly against the record 36. One end 85 of a reciprocating rod 84 slidably engages the arm 60. Thus, reciprocating rod 84 urges the arm 60 to move in the direction of arrow 88 in FIG. 7 and, thereby, opposes the force exerted by the spring 82. The reciprocating rod 84 is provided with a bend 92 of approximately 90° which engages the end stop 94 in order to prevent overtravel of the rod. For bearing support, rod 84 is carried in a pair of bearing blocks 96 which are secured to the housing 10.

The needle return knob 14 is connected to one end of a needle return shaft 98 and the other end thereof is connected to a coupling plate 100. The end 102 of the reciprocating rod 84 opposite the bend 92 is rotatably secured to the coupling plate 100 as by means of a vertical boring therein. Thus, when needle return knob 14 is rotated in the direction of arrow 104 as seen in FIG. 7, the reciprocating rod 84 moves in the direction of arrow 106 as viewed in FIG. 7, thereby, moving the arm 60 in the direction of arrow 88 as seen in FIG. 7.

Reciprocating rod 84 is provided with a contact portion 108 for engaging a rod 110 which is pivotally mounted on pin 111 secured to mounting block 112 which, in turn, is fixedly connected to the housing 10. One end of the rod 110 is pivotally mounted in a recess or journal in plate 114 which is fixedly mounted on the housing 10 while the other end of the rod 110 is provided with a head 116. This head 116 is adapted slidably to engage the end of the arm 60 for purposes of urging that arm in the direction of arrow 118 as viewed in FIG. 7. A leaf spring 120 is mounted on pin 111 and engages the rod 110 for purposes of urging the rod in a direction opposite to that indicated by arrow 118 in FIG. 7.

In operation, the needle 58 in its initial position as indicated by the solid lines in FIG. 6. As the record 36 is rotated, the needle 58 follows a spiral groove inwardly and thereby follows the direction indicated by arrow 121, illustrated in FIG. 6. The other end of arm 60 traverses a path indicated by the arrow 90 in FIG. 6. When the needle 58 has completed its travel and is in the position illustrated by the dotted lines in FIG. 6, or even of it has reached a position intermediate its extreme inward position, the operator may desire to return the needle 58 to its initial position for purposes of repeating the transcription upon the record or for playing a new record. The operator rotates needle return knob 14 in a counterclockwise direction as indicated in FIG. 7 and the coupling plate 100 thereby rotates in a counterclockwise direction as indicated by arrow 104. Since the end of the reciprocating rod 84 is connected to the coupling plate 100 the reciprocating rod 84 moves in the direction of arrow **106*a* as shown in FIG. 7. This movement urges the arm 60 to move in the direction of arrow 88 as illustrated in FIG. 7 and thereby lifts needle 58 out of contact with the record 36. Simultaneously with this movement, contact portion 108 of reciprocating rod 84 slidably engages the rod 110 and thereby tends to rotate same as indicated by arrow 122 in FIG. 7. This movement, in turn, rotates the other end of the rod 110 in the direction indicated by arrow 118. Movement of the head 116 in the direction of arrow 118 urges the end of arm 60 in the same direction so that the needle 58 moves in the direction as indicated by the arrow 124 until the head portion adjacent the needle reaches the end stop 126, which is provided to prevent overtravel of the needle in the direction of arrow 124. The operator then releases needle return knob 14 and spring 82 urges the end of arm 60 in the direction opposite the direction indicated by arrow 88 and the needle returns to its initial position. Simultaneously therewith, spring 120 urges rod 110 to rotate in a direction opposite to that indicated by arrow 122 and the head 116 moves in a direction opposite that indicated by the arrow 118**. Thus, the parts have returned to the position as illustrated in FIG. 6 and are ready to begin another cycle of operation.

Alternatively, a leaf spring 128 is mounted on the housing 10 positioned to engage the corner of the coupling plate 100 when the knob 14 is in its extreme counterclockwise position as viewed in FIG. 7. Thus, it is seen that when the needle 58 is to be returned to its initial position, the knob 14 is rotated in a counterclockwise direction as viewed in FIG. 7. The needle pivots inwardly away from the record 36 and then moves in the direction of arrow 124 until it reaches the end stop 126 where it remains (out of contact with the record). The operator may readily change records or reverse the record to play the other side without damage thereto due to contact with the needle. After the new record is secured in position, the operator rotates the knob 14 slightly in a clockwise direction to release the coupling plate 100 from engagement with the spring 128 so that the needle pivots outwardly against the record in its initial position. Suitable markings 130 may be imprinted on the knob 14 or the housing 10 to indicate the aforementioned operation to the operator.

It is to be particularly noted that the turn-table 34 contains a magnetic portion which attracts the ferrous insert 38 and hence the record 36 into firm engagement therewith. Also, spring 82 urges needle 58 into firm engagement with the record 36. Thus, it is seen that the reception is not interrupted or disturbed due to shock, concussion or other sudden movements.

Although particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a record player of the class described, a turntable, means for positioning a record on said turn-table, means for rotating said turn-table, an arm, a needle held by said arm and adapted to traverse said record from an initial position thereon, means cooperating with said needle for amplifying sound waves picked up thereby, a speaker in operative connection with said last named means, power means for said last named means, the combination comprising: means for mounting said arm for pivotal movement, resilient means for urging said needle into engagement with said record, a reciprocating rod for disengaging said needle from said record, means for actuating said rod, releasable means actuated by said last named means for retaining said needle out of engagement with said record, and a pivotal rod pivotally mounted adjacent said arm for urging said arm towards its initial position, said pivotal rod being actuated by movement of said reciprocating rod.

2. In a record player of the class described having a turn-table provided with an obliquely disposed record receiving surface, magnetic means for positioning a record on said turn-table, means for rotating said turn-table, an arm, a needle held by said arm and adapted to traverse said record from an initial position thereon, means cooperating with said needle for amplifying sound waves picked up thereby, the combination comprising: a universal joint for mounting said arm, resilient means for urging said needle into engagement with said record, a reciprocating rod engaging one end of said arm for disengaging said needle from said record, means for reciprocating said rod, a pivotal rod having one end thereof engaging said arm for urging said needle towards its initial position and having the other end thereof in sliding engagement with said reciprocating rod whereby said reciprocating rod actuates said pivotal rod, and resilient means for urging said pivotal rod out of engagement with said arm.

3. In a record player of the class described, the combination comprising: a turn-table having an obliquely disposed record receiving surface, magnetic means carried by said turn-table for positioning a record on said turntable, means for rotating said turn-table, an arm, a needle held by said arm and adapted to traverse said record from an initial position thereon, means cooperating with said needle for amplifying sound waves picked up thereby, a speaker in operative connection with said last named means, power means for said last named means, a universal joint for mounting said arm, needle return control means adapted for rotary motion, a reciprocating rod having one end thereof pivotally attached to said control means and the other end thereof being adapted to slidably engage said arm to impart unilateral motion thereto for removing said needle from engagement with said record, a spring attached to said arm to oppose such unilateral motion, a pivotal rod having one end thereof adapted for sliding engagement with said reciprocating rod whereby movement of the reciprocating rod imparts rotary motion to the pivotal rod, a spring mounted on said pivotal rod for opposing such last named motion and the other end of the pivotal rod being adapted for sliding engagement with said arm for imparting unilateral motion thereto for returning said needle to its initial position, whereby rotation of said control means disengages said needle from the record and returns same to its initial position.

4. In a record player of the class described, a needle return apparatus comprising: an arm, a needle held by said arm and adapted to traverse the record from an initial position thereon, a universal joint, needle return control means adapted for rotary motion, a reciprocating rod having one end thereof pivotally attached to said control means and the other end thereof adapted to slidably engage said arm to impart unilateral motion thereto for removing said needle from engagement with said record, resilient means attached to said arm to oppose such unilateral motion, a pivotal rod, one end of which being adapted for sliding engagement with said reciprocating rod whereby movement of the reciprocating rod imparts rotary motion to the pivotal rod, resilient means for opposing such last named motion, the other end of said pivotal rod being adapted for sliding engagement with said arm for imparting unilateral motion thereto for returning said needle to its initial position, whereby rotation of said control means removes said needle from the record and returns same to its initial position.

5. In a record player of the class described, a needle return apparatus comprising: an arm, a needle held by said arm and adapted to traverse the record from an initial position thereon, a universal joint, needle control means adapted for rotary motion, a reciprocating rod having one end thereof pivotally attached to said control means and the other end thereof adapted to slidably engage said arm to impart unilateral motion thereto for removing said needle from engagement with said record, releasable means actuated by said needle control means for retaining said needle out of engagement with said record, resilient means attached to said arm to oppose such unilateral motion, a pivotal rod, one end of which being adapted for sliding engagement with said reciprocating rod whereby movement of the reciprocating rod imparts rotary motion to the pivotal rod, resilient means for opposing such last named motion, the other end of said pivotal rod being adapted for sliding engagement with said arm for imparting unilateral motion thereto for returning said needle to its initial position, whereby rotation of said control means removes said needle from the record and returns same to its initial position.

References Cited by the Examiner

UNITED STATES PATENTS

| | | | |
|---|---|---|---|
| 2,489,146 | 11/1949 | Louchheim | 274—9 |
| 2,806,704 | 9/1957 | Burdett | 274—10 |
| 3,073,605 | 1/1963 | Mennie | 274—1 |

NORTON ANSHER, *Primary Examiner.*

W. E. JACKSON, *Assistant Examiner.*